(12) United States Patent
George et al.

(10) Patent No.: US 8,954,019 B2
(45) Date of Patent: Feb. 10, 2015

(54) MOBILE WIRELESS COMMUNICATIONS DEVICE WITH LNA FRONT END CIRCUIT AND RELATED METHODS

(75) Inventors: Liviu George, Waterloo (CA); Simon Andrew Hughes, Waterloo (CA); Christopher Robert Little, Kitchener (CA); Tajinder Manku, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 133 days.

(21) Appl. No.: 13/565,955

(22) Filed: Aug. 3, 2012

(65) Prior Publication Data

US 2014/0038532 A1 Feb. 6, 2014

(51) Int. Cl.
*H04B 1/44* (2006.01)

(52) U.S. Cl.
USPC .................. 455/78; 455/73; 455/82; 455/83; 455/550.1; 455/130

(58) Field of Classification Search
CPC ......... H04B 1/44; H04B 1/006; H04B 1/0057
USPC .......... 455/73, 78, 82, 83, 550.1, 552.1, 130, 455/168.1, 280, 306, 341
See application file for complete search history.

(56) References Cited

U.S. PATENT DOCUMENTS

| | | | |
|---|---|---|---|
| 7,986,741 B2 | 7/2011 | Tsai et al. | |
| 8,219,056 B2 | 7/2012 | Sundstrom et al. | |
| 2007/0066254 A1* | 3/2007 | Tsuchie et al. | 455/183.2 |
| 2007/0111661 A1* | 5/2007 | Bargroff et al. | 455/13.3 |
| 2008/0299914 A1* | 12/2008 | Nakajima et al. | 455/83 |
| 2009/0019337 A1 | 1/2009 | Pi et al. | |
| 2010/0167673 A1* | 7/2010 | Vavelidis et al. | 455/150.1 |
| 2011/0032890 A1 | 2/2011 | Wu | |
| 2011/0053539 A1 | 3/2011 | Sundstrom et al. | |
| 2011/0128919 A1 | 6/2011 | Kim et al. | |
| 2011/0312288 A1 | 12/2011 | Fu et al. | |
| 2012/0039229 A1 | 2/2012 | Etemad et al. | |
| 2012/0069766 A1 | 3/2012 | Fu et al. | |
| 2012/0076077 A1 | 3/2012 | Buckley et al. | |
| 2012/0082263 A1 | 4/2012 | Ebrahimi Tazeh Mahalleh et al. | |
| 2012/0083278 A1 | 4/2012 | Kazmi et al. | |
| 2012/0083284 A1 | 4/2012 | Harrison et al. | |

FOREIGN PATENT DOCUMENTS

| | | |
|---|---|---|
| EP | 1381163 | 1/2004 |
| EP | 2372844 | 10/2011 |

* cited by examiner

*Primary Examiner* — Tuan Pham
(74) *Attorney, Agent, or Firm* — Allen, Dyer, Doppelt, Milbrath & Gilchrist, P.A.

(57) ABSTRACT

A mobile wireless communications device may include an antenna, LTE RF differential inputs, and a front end circuit. The front end circuit may include band pass filters coupled to the antenna, LNAs coupled respectively to the band pass filters, and RF switching circuits. Each RF switching circuit may be respectively coupled between each LNA and a pair of LTE RF differential inputs and configured to switch to one or both of the pair of LTE RF differential inputs.

20 Claims, 4 Drawing Sheets

MOBILE WIRELESS COMMUNICATIONS DEVICE WITH LNA FRONT END CIRCUIT AND RELATED METHODS

TECHNICAL FIELD

This application relates to the field of communications, and more particularly, to mobile wireless communications devices and related methods.

BACKGROUND

Cellular communication systems continue to grow in popularity and have become an integral part of both personal and business communications. Cellular telephones allow users to place and receive phone calls almost anywhere they travel. Moreover, as cellular telephone technology is advanced, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

Cellular devices have radio frequency (RF) processing circuits and receive or transmit radio communications signals typically using modulation schemes. The typical cellular device may have multiple transmit and receive pathways from the antenna to a digital signal processor (DSP). In particular, each signal pathway may comprise a filter to help isolate the desired frequency band from extraneous electromagnetic signals, for example, noise and interference. Nevertheless, as frequency bands change because of regulatory reasons, expansion, etc. and as more transceivers are added to the cellular device, the likelihood of self-interference may increase.

The routing of the pathways from the antenna to the DSP in a fourth generation Long Term Evolution (LTE) device may be problematic, particularly, the RF performance demands in carrier aggregation mode. Referring to FIG. 1, an approach to a receiver device 90 is shown. The receiver device 90 illustratively includes an LTE transceiver 95 comprising a plurality of primary and secondary receivers 96a-96c, 97a-97c. The receiver device 90 illustratively includes a plurality of band pass duplexers 91a-91d for passing the respective bands of the LTE communication standard. The receiver device 90 illustratively includes a pair of double-pole, four throw switches 92a-92b coupled between the band pass duplexers 91a-91b and the LTE transceiver 95, and a pair of double-pole, double-throw switches 93a-93b coupled between the band pass duplexers 91c-91d and the LTE transceiver 95. A potential drawback of this approach is that the front end module of the receiver device 90 is complicated, which adds to difficulty and cost of manufacture. Moreover, as more band capabilities are added, the complexity also increases.

DETAILED DESCRIPTION OF THE PREFERRED EMBODIMENTS

Figure 1:
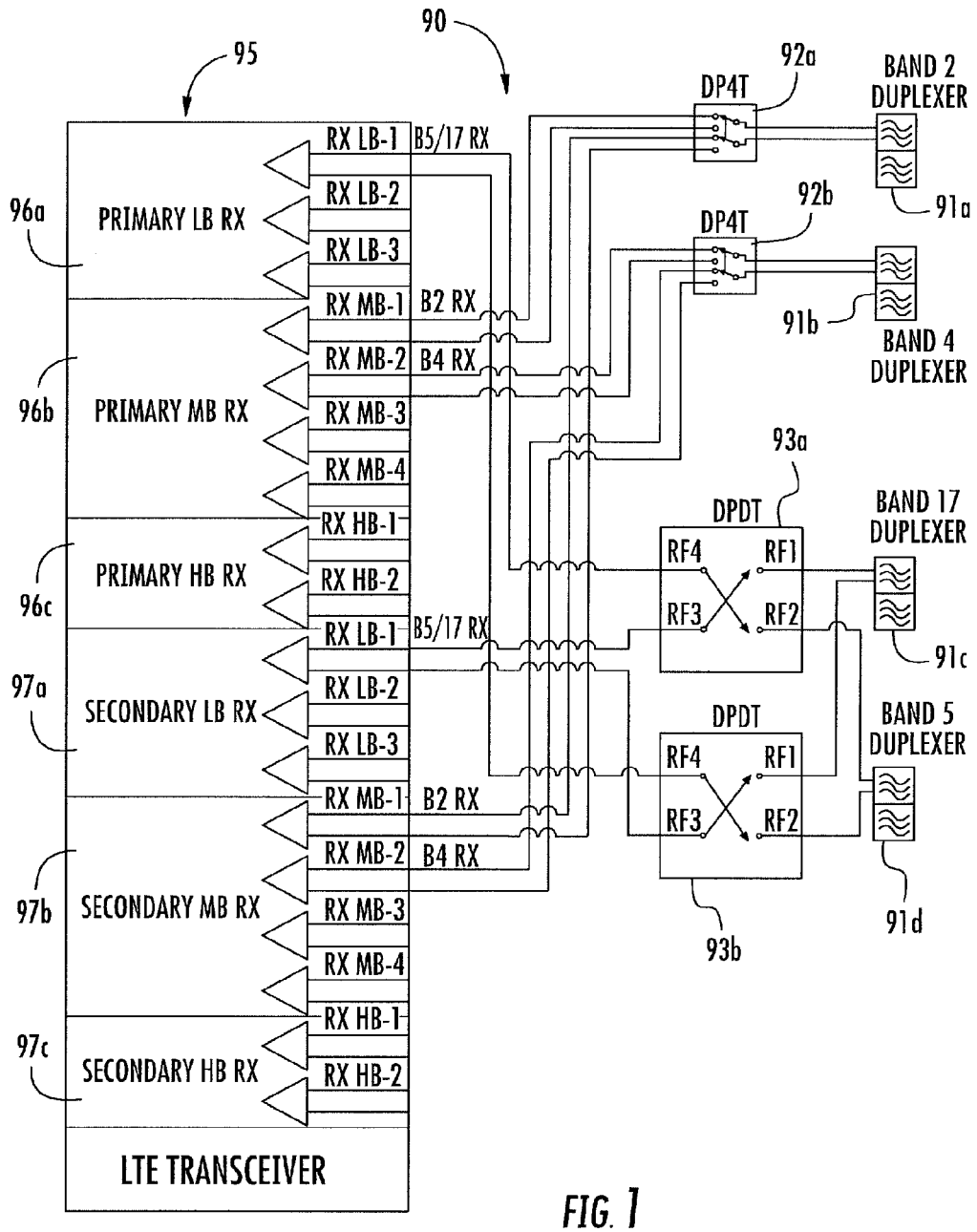
FIG. 1 is a schematic block diagram of a mobile wireless communications device, according to the prior art.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device may include an antenna, a plurality of LTE RF differential inputs, and a front end circuit. The front end circuit may comprise a plurality of band pass filters coupled to the antenna, a plurality of LNAs coupled respectively to the plurality of band pass filters, and a plurality of RF switching circuits, each RF switching circuit respectively coupled between each LNA and a pair of LTE RF differential inputs and configured to switch to one or both of the pair of LTE RF differential inputs. Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

The plurality of LTE RF differential inputs may comprise a group of low band LTE RF differential inputs, a group of mid band LTE RF differential inputs, and a group of high band LTE RF differential inputs. The mobile wireless communications device may further comprise a controller configured to operate the plurality of RF switching circuits in a carrier aggregation mode. For example, the controller may be configured to operate based upon a Mobile Industry Processor Interface (MIPI).

More specifically, the front end circuit may comprise a plurality of RF splitters respectively coupled between the plurality of LNAs and the plurality of RF switching circuits. Each RF switching circuit may comprise a pair of single-pole, double-throw (SPDT) switches coupled to a respective one of the plurality of RF splitters.

In some embodiments, the front end circuit may comprise a plurality thereof including a low band front end circuit, a mid band front end circuit, and a high band front end circuit. The front end circuit may comprise a plurality of RF baluns respectively coupled to the plurality of RF switching circuits. The mobile wireless communications device may further comprise a housing containing the antenna, the plurality of LTE RF differential inputs, and the front end circuit.

Another aspect is directed to a method of making a mobile wireless communications device. The method may comprise coupling a front end circuit between a plurality of LTE RF differential inputs and an antenna. The front end circuit may comprise a plurality of band pass filters coupled to the antenna, a plurality of LNAs coupled respectively to the plurality of band pass filters, and a plurality of RF switching circuits. Each RF switching circuit may be respectively coupled between each LNA and a pair of LTE RF differential inputs and configured to switch to one or both of the pair of LTE RF differential inputs.

Figure 2:
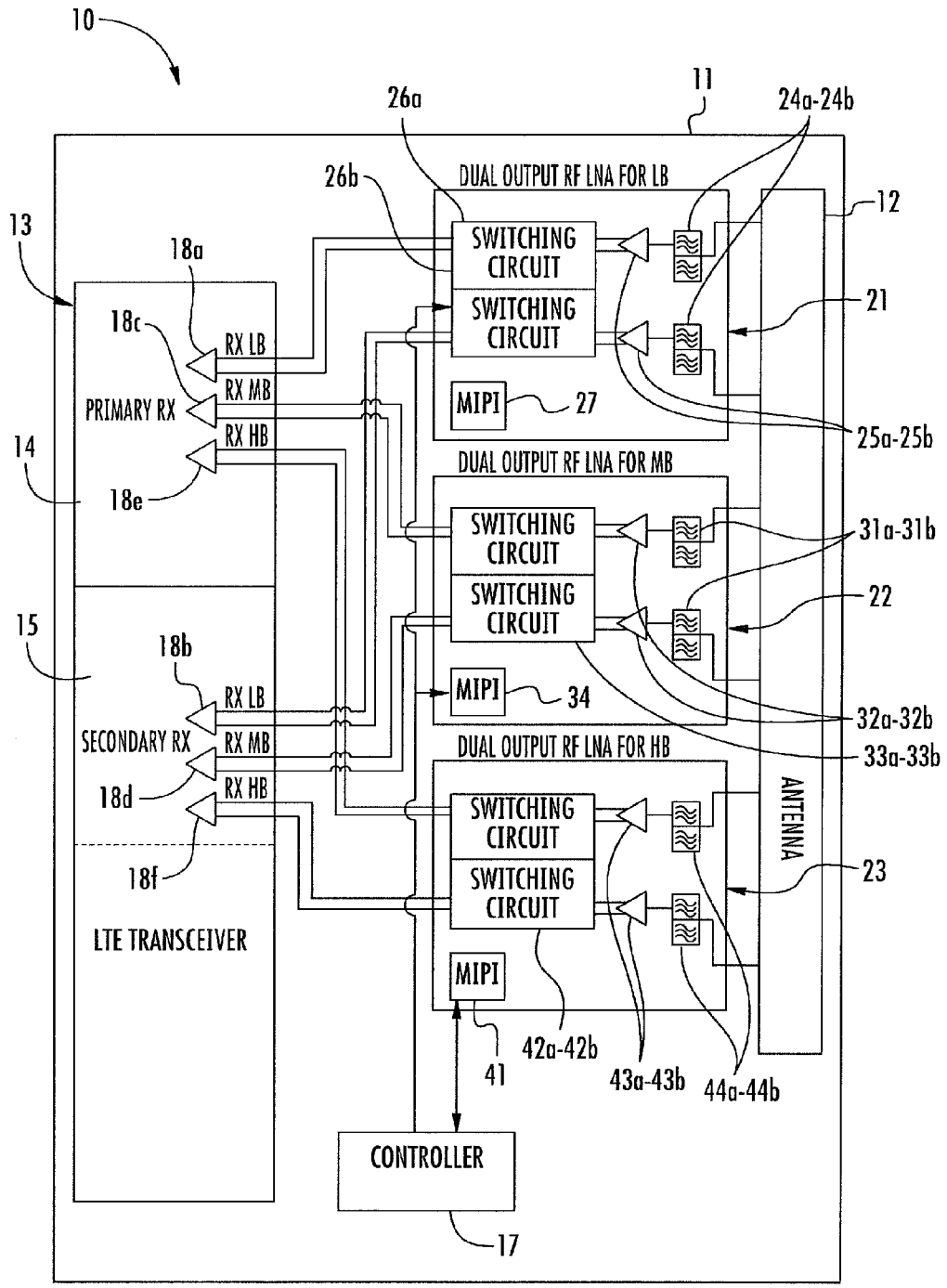
FIG. 2 is a schematic block diagram of an example embodiment of a mobile wireless communications device.

Referring now to FIG. 2, a mobile wireless communications device 10 according to the present disclosure is now described. The mobile wireless communications device 10 illustratively includes an antenna 12, and an LTE transceiver 13 coupled to the antenna. The LTE transceiver 13 illustratively includes a plurality of LTE RF receivers 14-15 (i.e. primary 14, and secondary 15 receivers). The LTE RF receivers 14-15 comprise a group of low band LTE RF differential inputs 18a-18b, a group of mid band LTE RF differential inputs 18c-18d, and a group of high band LTE RF differential inputs 18e-18f.

The mobile wireless communications device 10 illustratively includes a plurality front end circuits 21-23. The front end circuits 21-23 comprise a low band front end circuit 21, a mid band front end circuit 22, and a high band front end circuit 23. The front end circuits 21-23 are coupled respectively to the group of low band LTE RF differential inputs 18a-18b, the group of mid band LTE RF differential inputs 18c-18d, and the group of high band LTE RF differential inputs 18e-18f.

Each front end circuit 21-23 comprises a plurality of band pass filters (e.g. illustrated as band pass filter duplexers) 24a-24b, 31a-31b, & 44a-44b coupled to the antenna 12, a plurality of LNAs 25a-25b, 32a-32b, & 43a-43b coupled respectively to the plurality of band pass filters, and a plurality of RF switching circuits 26a-26b, 33a-33b, & 42a-42b. Each RF switching circuit 26a-26b, 33a-33b, & 42a-42b is respectively coupled between each LNA 25a-25b, 32a-32b, & 43a-43b and a pair of LTE RF differential inputs. Additionally, each RF switching circuit 26a-26b, 33a-33b, & 42a-42b is configured to switch to one or both of the pair of LTE RF inputs 18a-18b, 18c-18d, 18e-18f.

In the illustrated embodiment, the mobile wireless communications device 10 illustratively includes a controller 17 configured to operate the plurality of RF switching circuits 26a-26b, 33a-33b, & 42a-42b in a carrier aggregation mode. The controller 17 is configured to operate based upon a MIPI standard. In particular, in the illustrated embodiment, each front end circuit 21-23 comprises a MIPI module 27, 34, 41 for controlling the components therein. The mobile wireless communications device 10 illustratively includes a housing 11 containing the antenna 12, the LTE transceiver 13, the front end circuits 21-23, and the controller 17.

For simplicity, the illustrated embodiment of the mobile wireless communications device 10 only includes the main and secondary LTE receivers (LTE RF receivers 14-15). As will be appreciated, the mobile wireless communications device 10 could additionally include the other receivers, such as a multiple input multiple output (MIMO) receiver or a diversity receiver, but the respective front end circuits for these receivers may include either duplexers or filters, depending on the application. The LTE transceiver 13 inputs can be tuned for LB, MB, or HB, but given relaxed noise figure specifications, they can be wide bandwidth. If wide bandwidth LNAs are chosen, depending on the configuration, fewer than 12 RX inputs can be used.

Figure 3:
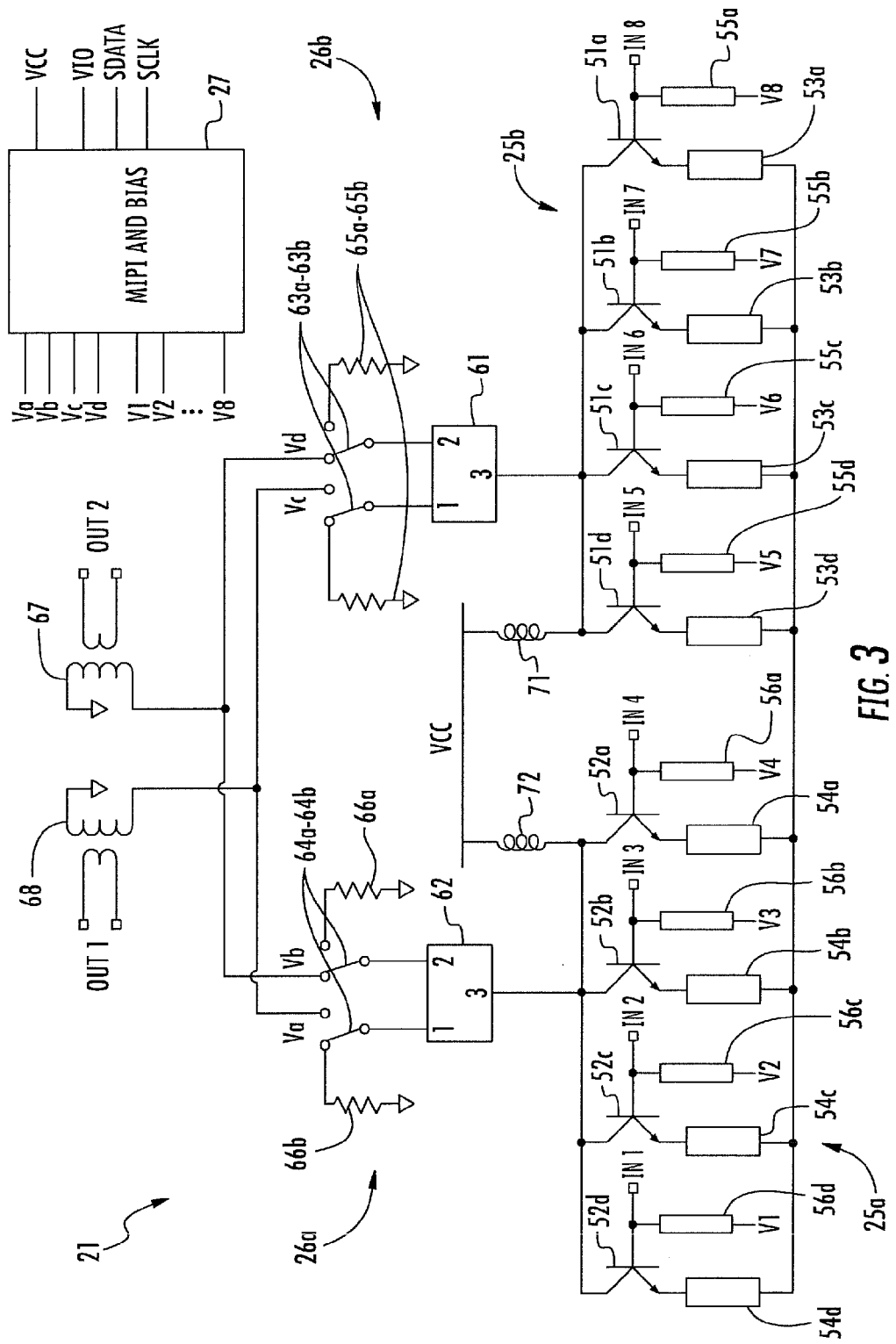
FIG. 3 is a detailed schematic block diagram of the front end circuit of the mobile wireless communications device of FIG. 2.

Referring now additionally to FIG. 3, the low band front end circuit 21 is now described in more detail. As will be appreciated, the mid band front end circuit 22, and the high band front end circuit 23 may each be similarly constituted. In the illustrated embodiment, the front end circuits 21-23 are used for one band set each (LB or MB or HB). In these embodiments, the other modules 22-23 can have the splitter+switch circuit bypassed by a 3 dB (actually, 3 dB plus the RF switch loss) attenuator. In some cases (like HB bands), more switches can be added to accommodate TDD bands and/or other special requirements.

More specifically, in the low band front end circuit 21, each LNA 25a-25b illustratively includes a bank of 4 BJT LNAs 51a-51d, 52a-52d, a bias resistor 55a-55d, 56a-56d coupled respectively to the base terminals, and a second resistor 53a-53d, 54a-54d coupled respectively to the emitter terminal. The collector terminals of the BJT LNAs 51a-51d, 52a-52d are coupled commonly to a power source VCC via a pair of inductors 71-72.

In each block of four BJT LNAs 51a-51d, 52a-52d, in some embodiments, a maximum of one BJT LNA would be active at any particular time. The LNA block design may use external compensation for the unwanted loading of the three BJT LNAs 51a-51d, 52a-52d that are turned off while one of them is active. This can be achieved with some inductive load or by LNA output matching.

The low band front end circuit 21 illustratively includes a plurality of RF splitters 61-62 respectively coupled between the plurality of LNAs 25a-25b and the plurality of RF switching circuits 26a-26b. Each RF switching circuit 26a-26b illustratively includes a pair of SPDT switches 63a-63b, 64a-64b coupled to a respective one of the plurality of RF splitters 61, 62, and a pair of 50Ω termination resistors 65a-65b, 66a-66b. The low band front end circuit 21 illustratively includes a plurality of RF baluns 67-68 respectively coupled to the RF switching circuits 26a-26b.

The SPDT switches 63a-63b, 64a-64b feed the RF baluns 67-68, depending on the selection made. This scheme allows any BJT LNA 51a-51d, 52a-52d from a block of four to drive either output or both. When the selected BJT LNA 51a-51d, 52a-52d drives only one output, the other RF splitter 61-62 port is terminated to the 50Ω resistor 65a-66b, thus keeping the RF splitter properly terminated and preserving the overall LNA+splitter+switch+balun gain constant. When one particular LNA 25a-25b/switching circuit 26a-26b drives both outputs (out 1 and out 2), the other splitter's outputs are terminated to 50Ω resistor 65a-66b (that LNA block of four BJT LNAs connected to this splitter is inactive). In the illustrated example, the RF baluns 67-68 and the RF splitters 61-62 are designed to cover only LB or MB or HB. The LNAs 25a-25b integrated circuit (IC) die can be designed to cover all LB and MB and HB bands. On-module RF matching components tune each LNA 25a-25b input to each 2G/3G/LTE band and input duplexer/filter. The outputs shall be tuned to LB, MB or HB set of bands respectively. The MIPI modules 27, 34, 41 and control circuits may be on a separate IC die. The LNA IC die may have its own bias circuitry logically controlled by the MIPI module 27, 34, 41. The switching circuits 26a-26b are also controlled by MIPI module 27.

Another aspect is directed to a method of making a mobile wireless communications device 10. The method may comprise coupling a front end circuit 21-23 between a plurality of LTE RF differential inputs 18a-18f and an antenna 12. The front end circuit 21-23 may comprise a plurality of band pass filters 24a-24b, 31a-31b, & 44a-44b coupled to the antenna 12, a plurality of LNAs 25a-25b, 32a-32b, & 43a-43b coupled respectively to the plurality of band pass filters, and a plurality of RF switching circuits 26a-26b, 33a-33b, & 42a-42b, each RF switching circuit respectively coupled between each LNA and a pair of LTE RF differential inputs and configured to switch to one or both of the pair of LTE RF differential inputs 18a-18f.

Advantageously, the mobile wireless communications device 10 described herein may provide an approach to issues in the rollout of new LTE Release 10, which may require simultaneous receiving on different frequency bands (carrier aggregation) and may create challenges for user equipment (UE) RF design. For example, one of the issues is the simultaneous receiving in low band+mid band while being able to receive a low band+high band and mid band+high band combination (low band stands for any of the LTE Bands 5, 8, 12, 13, 17, 20, mid band for LTE Bands 1,2,3,4, and high band for LTE band 7), as in European 20+3, 20+7 and 3+7 band combinations. Two receivers can accommodate 20+7 and 20+3, but there may be a need for special internal or external switching circuitry if the receiver accommodates bands 3+7 on the same receiver. If an internal switch is not available or if the Release 10 approach involves two separate RF integrated circuits (ICs) with differential receiver inputs, there may be an issue with switching signals between the two inputs/RF ICs. These band combinations are listed herein: LTE FDD: 17+2, 17+4, 13+4, MediaFLO+2, 3+7, 20+7, 20+3, 3+5; and 3G: 8+1, 5+1, 5+2, 2+4.

New band combinations are possible, such as low band+low band and other low band+mid band and low band+high band. In the case of noncontiguous intra-band carrier aggregation, where the two carriers are more than 20 MHz apart, the application may need to feed both receivers with the same signal, with one receiver locked on one carrier while the other receives the second carrier. This may require the output of the LNA to be split while keeping the gain reasonable close to the single receiver case.

The core of the issue is that a flexible receiver front end will not only help with achieving excellent performance, but would allow a greater flexibility to accommodate such changes in near and distant future. The RF designer would only have to customize external modules, a faster and lower cost alternative to re-spinning the RF IC.

Advantageously, the front end circuit 21-23 disclosed herein provides an approach to the problems outlined above by moving part of the RF IC internal LNAs into a front-end circuit that includes duplexers, filters, and RF switches, all of these being controlled by the MIPI interface, thus reducing the number of pins in these modules. The mobile wireless communications device 10 includes three types of front end circuits 21-23: low band, mid band and high band, each having different internal structure and using the same LNA die, only tuned to the respective band frequency.

The mobile wireless communications device 10 architecture proposed may provide the following advantages: 1) band coverage for all 2G/3G/LTE bands and band combinations for carrier aggregation (Releases 10 and up); 2) support of 3 carrier aggregation band combinations into 2 receivers with post-LNA dual-throw switches; this provides no reduction in performance, low component count and good integration, unlike known solutions; 3) minimum noise figure for the receiver chain, by having no additional RF switches between the LNA input and the RF main switch; 4) lower current consumption, compare to on-chip LNAs; 5) better noise immunity since the LNA is external to the RF IC die and has better isolation between the on-chip noise generating circuits and LNA inputs; 6) easier to design front-end circuit since there are only three differential inputs per receiver, with a total of 12 for the whole RF IC. This dramatically reduces the number of RX traces, from more than 60 to 24; and 7) flexibility for future requirements, no RF IC re-spin needed to accommodate new bands and band combinations.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
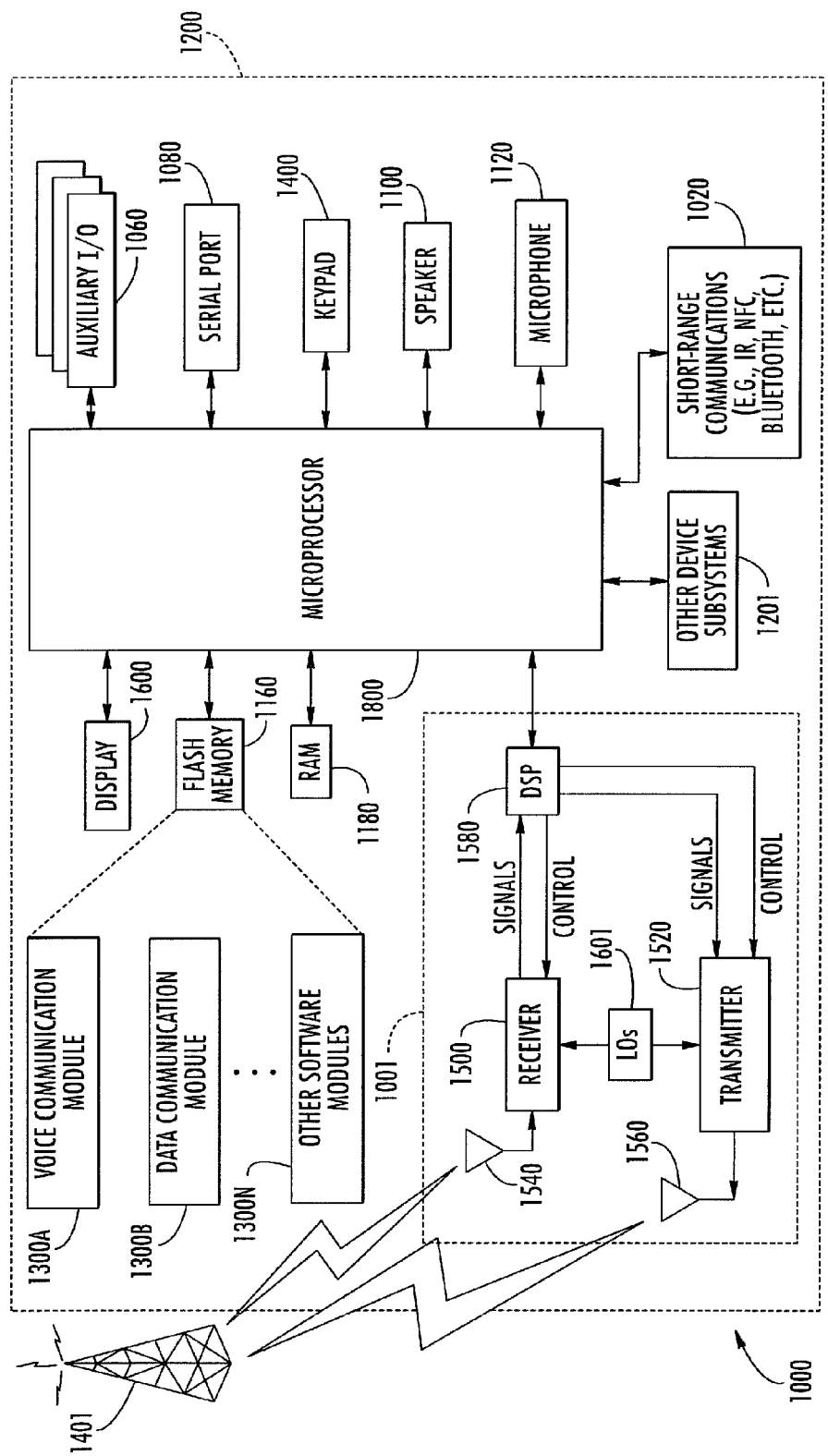
FIG. 4 is a schematic block diagram illustrating example components of a mobile wireless communications device that may be used with the mobile wireless communications device of FIG. 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
   an antenna;
   a plurality of Long Term Evolution (LTE) radio frequency (RF) differential inputs; and
   a low band front end circuit, a mid band front end circuit, and a high band front end circuit, each front end circuit comprising
      a plurality of band pass filters coupled to said antenna,
      a plurality of LNAs coupled respectively to said plurality of band pass filters, each LNA being individually tuned for a respective band, and
      a plurality of RF switching circuits, each RF switching circuit respectively coupled between each LNA and a pair of LTE RF differential inputs and configured to switch to one or both of said pair of LTE RF differential inputs.

2. The mobile wireless communications device of claim 1 wherein said plurality of LTE RF differential inputs comprises:
   a group of low band LTE RF differential inputs;
   a group of mid band LTE RF differential inputs; and
   a group of high band LTE RE differential inputs.

3. The mobile wireless communications device of claim 1 further comprising a controller configured to operate said plurality of RF switching circuits in a carrier aggregation mode.

4. The mobile wireless communications device of claim 3 wherein said controller is configured to operate based upon a Mobile Industry Processor Interface (MIPI).

5. The mobile wireless communications device of claim 1 wherein said front end circuit comprises a plurality of RF splitters respectively coupled between said plurality of LNAs and said plurality of RF switching circuits.

6. The mobile wireless communications device of claim 5 wherein each RF switching circuit comprises a pair of single-pole, double-throw switches coupled to a respective one of said plurality of RF splitters.

7. The mobile wireless communications device of claim 1 wherein said front end circuit comprises a plurality of RF baluns respectively coupled to said plurality of RF switching circuits.

8. The mobile wireless communications device of claim 1 further comprising a housing containing said antenna, said plurality of LTE RF differential inputs, and said front end circuit.

9. A mobile wireless communications device comprising:
   an antenna;
   a plurality of Long Term Evolution (LTE) radio frequency (RF) differential inputs;
   a low band front end circuit, a mid band front end circuit, and a high band front end circuit, each front end circuit comprising
      a plurality of band pass filters coupled to said antenna,
      a plurality of LNAs coupled respectively to said plurality of band pass filters, each LNA being individually tuned for a respective band, a plurality of RF switching circuits, each RF switching circuit respectively coupled between each LNA and a pair of LTE RE differential inputs and configured to switch to one or both of said pair of LTE RF differential inputs, and a controller configured to operate said plurality of RF switching circuits in a carrier aggregation mode; and a housing containing said antenna, said plurality of LTE RF differential inputs, and said front end circuit.

10. The mobile wireless communications device of claim 9 wherein said plurality of LTE RF differential inputs comprises:

a group of low band LTE RF differential inputs;
a group of mid band LTE RF differential inputs; and
a group of high band LTE RF differential inputs.

11. The mobile wireless communications device of claim 9 wherein said controller is configured to operate based upon a Mobile Industry Processor Interface (MIPI).

12. The mobile wireless communications device of claim 9 wherein said front end circuit comprises a plurality of RF splitters respectively coupled between said plurality of LNAs and said plurality of RF switching circuits.

13. The mobile wireless communications device of claim 12 wherein each RF switching circuit comprises a pair of single-pole, double-throw switches coupled to a respective one of said plurality of RF splitters.

14. The mobile wireless communications device of claim 9 wherein said front end circuit comprises a plurality of RF baluns respectively coupled to said plurality of RF switching circuits.

15. A method of making a mobile wireless communications device comprising:

coupling a low band front end circuit, a mid band front end circuit, and a high band front end circuit between a plurality of Long Term Evolution (LTE) radio frequency (RF) differential inputs and an antenna, each front end circuit comprising a plurality of band pass filters coupled to the antenna,
a plurality of LNAs coupled respectively to the plurality of band pass filters, each LNA being individually tuned for a respective band, and
a plurality of RF switching circuits, each RF switching circuit respectively coupled between each LNA and a pair of LTE RF differential inputs and configured to switch to one or both of the pair of LTE RF differential inputs.

16. The method of claim 15 wherein the plurality of LTE RF differential inputs comprises:

a group of low band LTE RF differential inputs;
a group of mid band LTE RF differential inputs; and
a group of high band LTE RF differential inputs.

17. The method of claim 15 further comprising coupling a controller to operate the plurality of RF switching circuits in a carrier aggregation mode.

18. The method of claim 17 wherein the controller operates based upon a Mobile Industry Processor Interface (MIPI).

19. The method of claim 15 wherein the front end circuit comprises a plurality of RF splitters respectively coupled between the plurality of LNAs and the plurality of RF switching circuits.

20. The method of claim 19 wherein each RF switching circuit comprises a pair of single-pole, double-throw switches coupled to a respective one of the plurality of RF splitters.

* * * * *